United States Patent [19]
Douglas

[11] Patent Number: 4,545,663
[45] Date of Patent: Oct. 8, 1985

[54] INTEGRAL SELF-DEVELOPING FILM UNIT AND SYSTEM FOR USE THEREOF

[75] Inventor: Lawrence M. Douglas, South Easton, Mass.

[73] Assignee: Polaroid Corporation, Cambridge, Mass.

[21] Appl. No.: 506,109

[22] Filed: Jun. 20, 1983

Related U.S. Application Data

[63] Continuation-in-part of Ser. No. 453,700, Dec. 27, 1982, abandoned.

[51] Int. Cl.⁴ .............................................. G03D 9/02
[52] U.S. Cl. .................................... 354/304; 354/21; 354/86; 430/209; 430/498
[58] Field of Search ................... 354/85, 86, 87, 304, 354/21; 430/209, 497, 498, 499

[56] References Cited

U.S. PATENT DOCUMENTS

| | | | |
|---|---|---|---|
| 2,500,422 | 3/1950 | Land | 430/499 |
| 2,627,460 | 2/1953 | Land | 430/209 |
| 2,686,716 | 8/1954 | Land | 430/209 |
| 3,335,652 | 8/1967 | Erikson . | |
| 3,607,285 | 9/1971 | Chen | 430/209 |
| 3,619,193 | 11/1971 | Knight | 430/209 |
| 3,621,768 | 11/1971 | Chen . | |
| 3,625,129 | 12/1971 | Van Allen | 354/304 |
| 3,751,256 | 8/1973 | Harvey | 430/498 |
| 3,761,268 | 9/1973 | Land et al. . | |
| 3,788,205 | 1/1974 | Pasieka et al. . | |
| 3,816,128 | 6/1974 | Chen . | |
| 3,848,985 | 11/1974 | Bennett | 354/21 |
| 3,882,518 | 5/1975 | Douglas . | |
| 4,017,879 | 4/1977 | Lermann et al. | 354/304 |
| 4,020,498 | 4/1977 | Friedman | 354/86 |
| 4,092,167 | 5/1978 | Bushey et al. . | |
| 4,121,230 | 10/1978 | Ohmura et al. | 354/21 |
| 4,247,626 | 1/1981 | Poshkus et al. . | |
| 4,289,840 | 9/1981 | Sylvester . | |
| 4,338,008 | 7/1982 | Pizzuti | 354/21 |
| 4,356,248 | 10/1982 | McCole . | |
| 4,360,260 | 11/1982 | Eloranta et al. . | |

Primary Examiner—A. A. Mathews
Attorney, Agent, or Firm—David R. Thornton

[57] ABSTRACT

An integral, self-developing film unit and processor in which all structural components of the film unit apart from a rupturable pod of processing fluid are provided by two superposed rectangular sheets of plastic material. The sheets sandwich one or more layers of photochemical composition, support the processing fluid pod at the leading edge thereof and define at the trailing edge of the unit, a trap for receiving residual processing fluid. The trap is provided by a flap at the end of one of the two sheets folded over the trailing edge of the other sheet. The absence of edge rails to establish the thickness of processing fluid spread into contact with the photochemicals between the sheets is accounted for by a controlled spacing gap at the pressure nip through which the unit is advanced for processing after exposure. Preferably, the film units are employed with a roller processor having a large diameter roller with a trap relieving recess therein designed for mating with the film unit to relieve roller pressure thereon, upon a single revolution of the roller.

23 Claims, 11 Drawing Figures

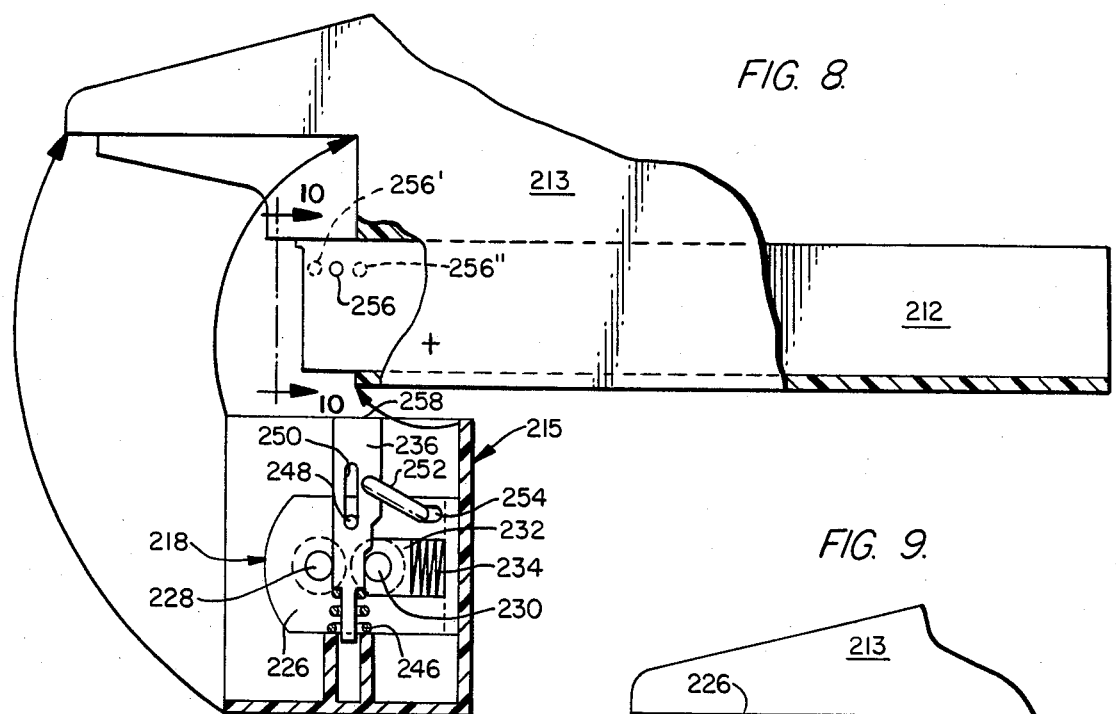
FIG. 8.
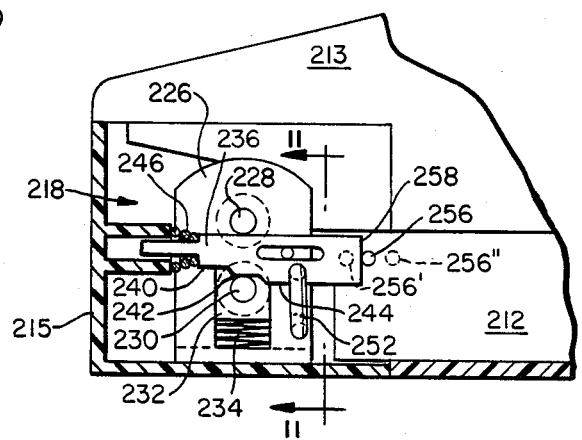
FIG. 9.
FIG. 10.
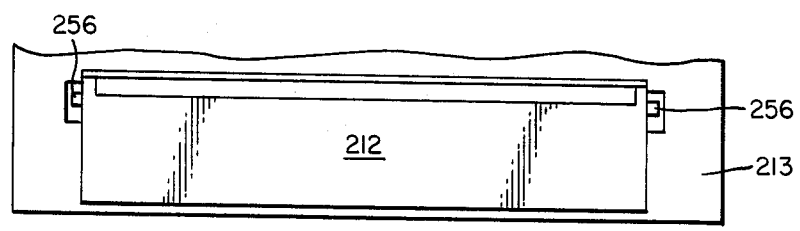
FIG. 11.
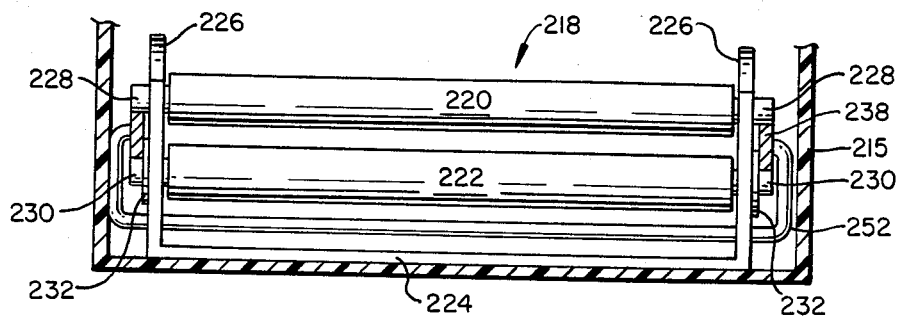

INTEGRAL SELF-DEVELOPING FILM UNIT AND SYSTEM FOR USE THEREOF

CROSS REFERENCE TO RELATED APPLICATIONS

This is a continuation-in-part of application Ser. No. 453,700, filed Dec. 27, 1982 (now abandoned).

BACKGROUND OF THE INVENTION

1. Field of Invention

This invention relates to instant photography and, more particularly, it concerns an instant photography system in which a novel self-developing film unit of the integral type is processed after exposure by direct passage of the exposed unit through a pressure nip provided by processing apparatus designed to accommodate the structure of the film unit.

2. Description of the Prior Art

In the art relating to self-developing film units of the type used in instant cameras, the term "integral" is commonly used to describe self-developing film units in which all components originally constituting the unit remain as a part thereof during exposure, processing, and in the ultimate photograph. Such film units are thus distinguished from those self-developing film units in which part of the original unit is removed from the physical structure of the unit between exposure and attainment of the final photograph. The term "integral," therefore, as used herein and in the appended claims, is intended to identify self-developing film units of the type in which all original parts of the unit remain in the photograph as distinguished from common usage of the term to suggest a one-part structure.

Integral self-developing film units are well known in the art and exemplified by the disclosures of the following U.S. patents among others: U.S. Pat. Nos. 3,621,768; 3,761,268; 3,816,128; 4,092,167; 4,247,626; and 4,356,248. Such film units typically include a pair of superposed rectangular sheets, at least one of which is transparent, retained by a frame-like binder having leading and trailing edges joined by side edges. The frame margin at the leading edge is relatively wide to accommodate a rupturable pod of processing fluid to be spread between the two sheets upon passage of the film unit through a pressure nip, usually defined by a pair of rollers. Chemicals contained between the two sheets respond to light during exposure and to the processing fluid after exposure to provide a photographic image visible through the transparent sheet or sheets of the framed unit.

In addition to the aforementioned components which are apparent from observation of the film unit exterior, such units contain interior structural components which heretofore have been important to the diffusion transfer developing process initiated by spread of the pod-contained processing fluid into contact with the chemicals contained between the two superposed sheets of the unit. In this context, for example, it is important that the thickness of the processing fluid layer spread throughout the area of the superposed sheets be uniform and controlled within extremely close tolerances on the order of 0.0001 inch. The thickness of the processing fluid layer will, moreover, vary by such tolerance depending on the sensitometry of a given batch of chemicals used in the film units. Heretofore, the thickness of the processing fluid layer spread between the superposed sheets by pressure rollers, for example, has been controlled by introducing a pair of rails between the superposed sheets and extending along the marginal side edges thereof between the leading and trailing edges of the film unit. In this way, the precise thickness of the rails and thus the precise thickness of the processing fluid layer could be controlled within the indicated tolerances.

Another interior adjunct of integral self-developing film units heretofore used has involved the requirement for a trap at the trailing edge of the unit to accommodate any excess of processing fluid remaining after the spread of fluid between the superposed sheets. Such traps have typically employed a separate spacer provided with fluid receiving pockets or the like, the spacers assuring retention of the excess processing fluid within the unit upon passage through the pinch roller pair. A review of the above cited patents will reveal other film unit structural refinements resulting from the extensive developmental effort which is contributed to the success of such units.

While the construction of integral self-developing film units presently in use has been highly effective in the attainment of high-quality photographic prints and photographic transparencies, there is a need for reduced structural complexity in film units of this type and a corresponding reduction in manufacturing costs.

SUMMARY OF THE INVENTION

In accordance with the present invention, an instant photography system is provided in which the full complement of structural components used in integral film units of the type aforementioned is provided exclusively by a pair of superposed sheets and a self-contained pod of processing fluid oriented transversely across the leading edge of the two sheet units. After exposure in conventional fashion, the film unit of the invention is advanced to the nip of a pressure roll pair which, in a preferred embodiment, comprises a pair of rollers each having a circumference approximating the full length of the film unit so that the processing operation is accommodated by a single revolution of the processing rollers. As a result of this organization, residual processing fluid remaining at the trailing edge of the film unit is retained in a folded flap of one of the two sheets about the trailing edge of the other without danger of it being expressed beyond the edges of the sheets due to an axial pocket-like recess in the processing rollers at that portion of their periphery registering with the trailing edge of the sheet unit.

Spacing of the rollers at the nip to account for sensitometry of the photochemicals sandwiched between the sheets of each film unit or of each batch of such units is effected by adjusting the axial position of one of the two pinch rollers toward or away from the other. The processing apparatus includes, in addition to the pinch roller pair, cooperating edge retention shoes which precede the rollers in the context of direction of film unit travel through the nip of the rollers during processing. The retention shoes yieldably seize the marginal side edges of the two sheets to prevent extrusion of processing fluid laterally out from the side edges of the film unit.

The roller spacing adjustment may be achieved by fixing the axis of one of the roller pair and mounting the other of the rollers from a bracket adjustable by means such as a screw adjustment. Alternatively, the adjustable one of the two rollers may be positioned by a shiftable device having stepped increments corresponding to variations in roll nip gap spacing increments needed for the range of sensitometry variations contemplated in manufactured batches of film units. The shiftable device may be actuated by a form of tactile discontinuity on the cassette or container of film units having a batch sensitometry to which the tactile discontinuity corresponds. Also, the roll nip gap may be effected by replaceable collars mounted at the ends of the rollers and adapted to engage the side edges of the film unit.

Where roller diameters needed to provide a roller circumference substantially equal to the length of a film unit cannot be accommodated by space in the photographic equipment used for film unit exposure, conventional or relatively small diameter rollers may be used. In this instance, the residual processing fluid remaining at the trailing edge of the film unit is received in a trap provided by spaced fingers cut into one of the two sheets of unit about which a trailing flap of the other sheet is folded.

A principal object of the present invention is, therefore, the provision of a self-developing photographic system capable of using a structurally simplified integral film unit by which film unit manufacturing costs may be reduced by comparison to film units of the prior art having comparable overall performance characteristics or quality. Other objects and further scope of applicability of the present invention will become apparent from the detailed description to follow taken in conjunction with the accompanying drawings in which like reference numerals designate like parts.

BRIEF DESCRIPTION OF THE DRAWINGS

FIG. 8 is a fragmentary schematic side elevation illustrating a system for adjusting pinch roller spacing by tactile indicia carried on a film cassette;

FIG. 9 is a view similar to FIG. 8 but with components in a different operative condition;

FIG. 10 is an end view as seen on line 10—10 of FIG. 8; and

FIG. 11 is a cross section on line 11—11 of FIG. 9.

DETAILED DESCRIPTION OF THE PREFERRED EMBODIMENTS

Figure 2:
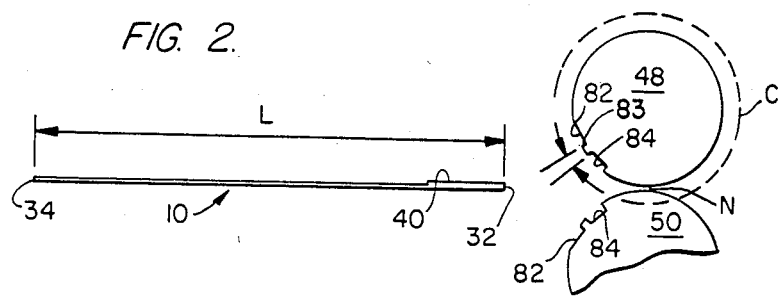
FIG. 2 is a schematic illustration depicting relative dimensions of the film unit of FIG. 1 and processing apparatus for developing the film unit.
Figure 3:
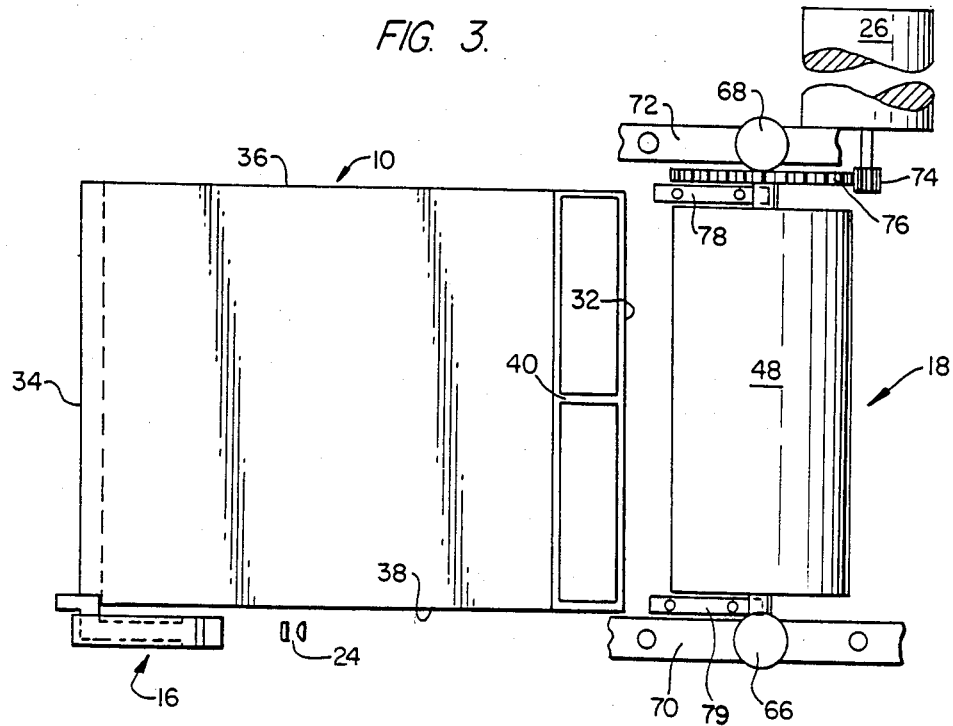
FIG. 3 is a plan view illustrating a preferred embodiment of the system of the present invention.
Figure 4:
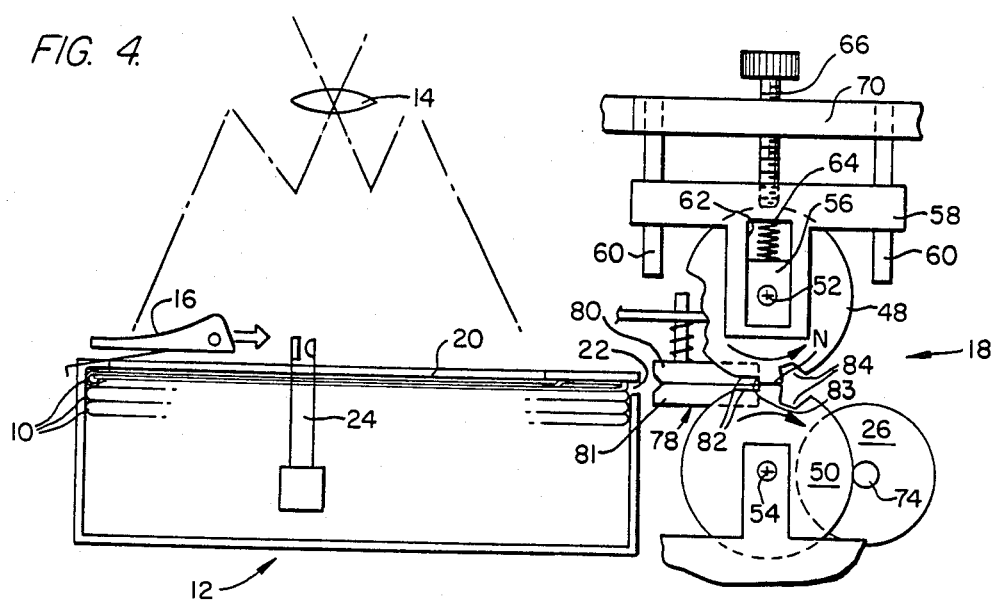
FIG. 4 is a side elevation, in partial cross section, illustrating the apparatus of FIG. 3.

In FIGS. 1-4 of the drawings, a preferred embodiment of the instant photography system in accordance with the present invention is shown to include an integral film unit 10, a cassette 12 for containing a plurality of film units 10, a film unit exposure apparatus such as a camera represented schematically in FIG. 4 by an objective lens 14, a film advance pick 16, and a film unit processing assembly 18. While details of the exposure apparatus represented by the objective lens 14 are not shown in the drawings in the interest of more clearly illustrating the novel components of the present invention, such devices are well known and may take the form of a conventional self-developing camera or relatively large, industrial-type photographic installations in which camera components are contained within a fixed cabinet-type enclosure or such an enclosure adapted to be mounted on a fixed support such as a tripod.

It is contemplated that the embodiment of FIGS. 1-4 will be incorporated in such an industrial-type apparatus or in relatively large cameras where interior space limitations are not presented. Thus, it will be appreciated that structural support to retain the processing assembly 18, the pick 16, and the cassette 12 in the orientation shown in FIG. 4, for example, will be provided by the body or cabinet of such an industrial-type photographic apparatus. Also, it is to be noted that the cassette 12 as well as the pick 16 are of conventional design in the sense that the film units 10 are presented successively to an exposure window 20 in the top wall of the cassette for exposure to image light passing the objective lens 14, then to be advanced by the pick 16 laterally through a slot-like opening 22 at the top of the front wall of the cassette 12. A microswitch 24 is positioned to be closed by the pick 16 for energization of a drive motor 26 in a manner to be described in more detail below.

Figure 1:
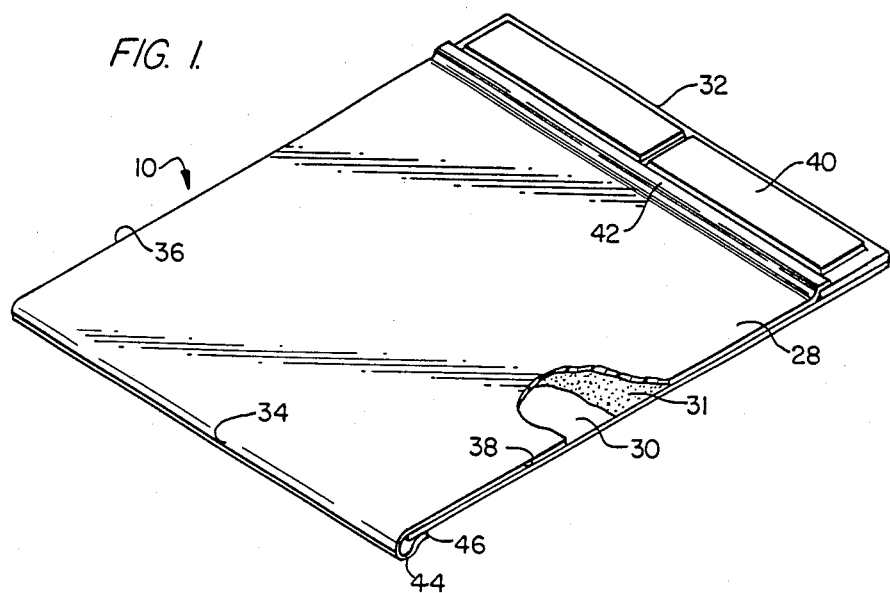
FIG. 1 is a perspective view illustrating a preferred embodiment of a film unit in accordance with the present invention.

The film unit 10 is shown most clearly in FIG. 1 of the drawings to include a pair of superposed rectangular top and bottom sheets 28 and 30, respectively. One or both of the sheets 28 and 30 may be formed of transparent, synthetic resinous sheet material such as polyester and in accordance with conventional practice, sandwich one or more layers 31 of chemical compositions commonly employed in film units designed for exposure and development by well-known diffusion transfer technology. The rectangular configuration of the sheets 28 and 30 define in the film unit 10 a leading edge 32, a trailing edge 34, and parallel side edges 36 and 38. One of the two sheets 28 and 30, in this instance the bottom sheet 30, extends beyond the other or the upper sheet 28 at the leading edge 32 of the unit 10 to support a rupturable pod 40 of processing fluid. It will be noted that the trailing edge of the pod underlies the leading edge portion 42 of the top sheet 28 in the illustrated embodiment so that upon introduction of the leading edge 32 of the unit 10 to a pressure nip, the trailing edge of the pod 40 is ruptured to distribute processing fluid contained therein rearwardly between the two sheets 28 and 30.

At the trailing edge 34 of the film unit 10, one of the two sheets 28 and 30, in this instance the top sheet 28, extends as a trailing flap 44 folded about the trailing edge of the other sheet 30. The end edge 46 of the flap 44 is tacked such as by adhesion or by fusion to the bottom sheet 30, thus leaving the remainder of the flap 44 free to move away from the trailing end of the sheet 30 and also in the region under the sheet 30 near the trailing end thereof. The flap 44, thus constituted, defines an expandable, or at least pressure sensitive, trap at the trailing edge 34 of the film unit for receiving residual processing fluid in excess of that originating in the pod 40 and distributed throughout the area between the two sheets 28 and 30.

Portions of the two sheets 28 and 30 in contact with the pod 40 may be secured in place by adhesion/fusion means. The term "adhesion/fusion means," as used herein and in the appended claims, means securement by an adhesive or bonding medium as well as by fusion using heat, ultrasonic or solvent welding techniques. The term is intended to exclude securement by binder fabrics and the like. While the sheets 28 and 30 may be secured to each other in similar fashion along the side edges 36 and 38 for structural integrity in the unit 10, a fluid-tight seal along the edges 36 and 38 is not necessary for reasons which will become apparent from the description to follow.

The processing assembly 18 is shown in FIGS. 3 and 4 of the drawings to include a pair of pinch rollers 48 and 50 supported for rotation about parallel axes 52 and 54, respectively. The roller 50 is supported by fixed bearing brackets 55 forming part of or otherwise rigidly mounted in the housing or cabinet (not shown) of the camera including the objective lens 14. The upper roller 48 is journaled at opposite ends in vertically slidable bearing blocks 56, in turn supported by brackets 58 which are adjustable vertically as along guide rods 60 in the embodiment illustrated. The bearing blocks 56 ride in guide slots 62 forming part of the respective brackets 58 and are biased downwardly in the guide slot by yieldable means such as a compression spring 64.

The roller support brackets 58 are adapted to be adjustably positioned in a vertical plane by support thereof from a pair of adjustment screws 66 and 68 threadably received in rails or beams 70 and 72, respectively secured or otherwise rigidly fixed in the housing or cabinet of the camera or photographic apparatus of which the assembly illustrated in FIGS. 3 and 4 is a part in practice. Either one or both of the rollers 48 and 50 is adapted to be driven by the motor 26 as a result of meshing engagement of a drive pinion 74 on the motor shaft with one of two meshing gears 76 coupled for direct rotation with the top and bottom rollers 48 and 50, respectively. The gears 76 are of the same effective diameter as the common diameter of both rollers 48 and 50 to assure synchronous rotation of the two rollers 48 and 50 during operation of the drive motor 26.

The processing assembly 18 further includes two pairs 78 and 79 of cooperating pressure shoes 80 and 81, the pressure shoe pairs being positioned at opposite ends of the rollers 48 and 50 and extending from the infeed side of the rollers 48 and 50 or toward the film unit cassette 12. As may be seen in FIG. 3 of the drawings, the guide shoe pairs 78 and 79 are positioned at the end of the rollers to be aligned with the side edges 36 and 38 of the film unit 10. In this respect, it will be noted also that the length of the rollers 48 and 50 is less than the transverse width of the film unit 10 approximately by the dimensions of the pressure shoe pairs 78 and 79.

While the pressure rollers 48 and 50 are generally cylindrical in configuration and thus define a pressure nip N between the cylindrical surfaces thereof, it will be noted in FIG. 4 that the rollers 48 and 50 are axially grooved or otherwise configured to establish a pair of cooperable film entrance flats 82, which define reference surfaces 83, and a pair of trap clearance recesses or grooves 84. The entrance flats 82 as well as the clearance grooves 84 are retained in registry by the meshing of the gears 76 secured rotatably to the respective rollers 48 and 50. Also and as depicted most clearly in FIG. 2 of the drawings, the circumference of the rollers 48 and 50 in the embodiment of FIGS. 1-4, between reference surfaces 83 and the trailing end of the clearance grooves 84, thus represented by the dimension C in FIG. 2, is equated by appropriate selection of the roller diameter to the length L of the film unit between the leading and trailing edges 32 and 34 thereof. As a result of this dimensional relationship, cooperation between the leading and trailing edges of the film unit 10 with the entrance flats 82 and grooves 84 is assured for each film unit 10.

In operation, and after exposure of the uppermost film unit 10 in the film cassette 12, the pick 16 is actuated to advance the exposed top film unit 10 through the exit slot 22 so that the side edges thereof are received between the individual shoes 80 and 81 of each pressure shoe pair 78 and 80 and so that the leading edge 32 of that film unit is received between the entrance flats 82 of the rollers 48 and 50. As the pick 16 is advanced to its forwardmost position, it engages the limit switch 24 to close a circuit including the drive motor 26, thereby to initiate rotation of the rollers 48 and 50 in the direction of the arrows shown in FIG. 4, for example. The film unit 10 thus positioned between the rollers will be advanced so that the processing fluid pod 40 is ruptured and so that processing fluid released from the pod 40 is advanced between the sheets 28 and 30 toward the trailing edge 34 thereof.

In this arrangement, once the film is adequately positioned within the flats 82 of the rollers 48 and 50 with the film's leading edge 32 immediately adjacent or in engagement with the reference surfaces 83, the pick 16 ceases its advancement of the film unit 10 just as it turns on the switch 24 to activate the rollers. When the switch 24 closes and the rollers 48 and 50 begin their rotation, the tangential points of the flats 82 (where the flats intersect the roller circumference) engage and pinch the film unit (actually the film pod) and pull it into the rollers. Hence, the flats 82 and their reference surfaces 83 provide in combination with the pick 16 and the switch 24, means for registration or synchronism of the film unit 10 with the rollers 48 and 50 to place their recesses 84 over the trap 44 at the completion of roller advancement.

In regard to such registration, it should be noted that the switch 24 may be made, or mounted, for slight ajustment of its position relative to the pick assembly to allow precise positioning of the leading end of the film unit in the rollers at the moment of roller activation. Moreover, it should also be noted that as the pod 40 is burst and its processing fluid forced between the two sheets 28 and 30 of the film unit 10, the viscosity of the fluid increases the thickness of the film unit over that due to the combined thickness of its two sheets, thereby causing an interference fit with the circumference of the rollers 48 and 50 which, in turn, results in the friction necessary to continue film advancement over its full length.

Because of the absence of rails or other spacing means in the film unit 10, the thickness of the processing fluid layer advanced throughout the area of the sheets 28 and 30 is determined solely as a result of the vertical positioning of the roller 48 by the adjustable screws 66 and 68. Also, it will be noted that when the trailing edge 34 of the film unit 10 reaches the nip N between the rollers, the trap defined by the flap 44 at the end of the film unit 10 will register with the groove 84 in respective rollers 48 and 50. As a result of this registration, residual processing fluid finding its way to the trap at the trailing edge 34 of the film unit will remain there and not be expressed outwardly by the rollers 48 and 50. Also in this respect, because the pressure shoe pairs 78 and 80 engage opposite side edges 36 and 38 of the film unit, any tendency for processing fluid to be expressed through the side edges of the film unit is prevented.

Upon completion of a processing cycle, conventional circuitry (not shown) will cause the rollers 48 and 50 to stop in the position shown in FIG. 4 or so that the entrance flats 82 are in registry. Subsequent cycles for successive film units 10 will be carried out as described.

Figure 5:
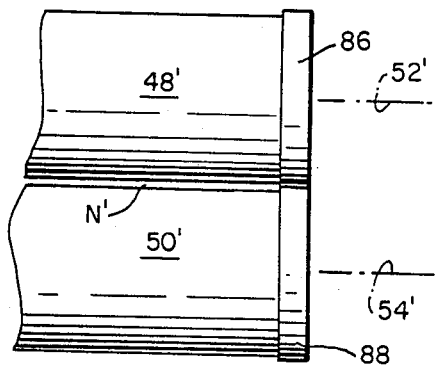
FIG. 5 is a fragmentary front elevation illustrating an alternative pinch roller embodiment in accordance with the invention.

In FIG. 5, a variation in the embodiment of FIGS. 1—4 is shown in which the rollers 48' and 50' are spaced to provide a pressure nip N' by removable end collars 86 and 88. Collars 86 and 88 function to space the rollers 48' and 50' to establish the gap at the pressure nip N' in a manner similar to the adjustable screws 66 and 68 in FIGS. 3 and 4. While the embodiment of FIG. 5 represents a viable variation in the embodiment of FIGS. 1-4, the embodiment of FIGS. 1-4 is preferred because of the ease by which adjustability of the pressure nip gap may be effected.

Figure 7:
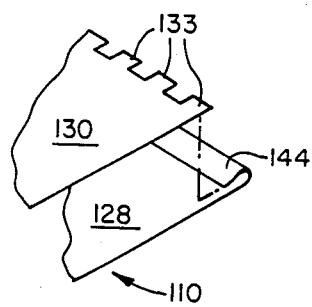
FIG. 7 is an exploded fragmentary perspective view illustrating an alternative embodiment of a film unit.
Figure 6:
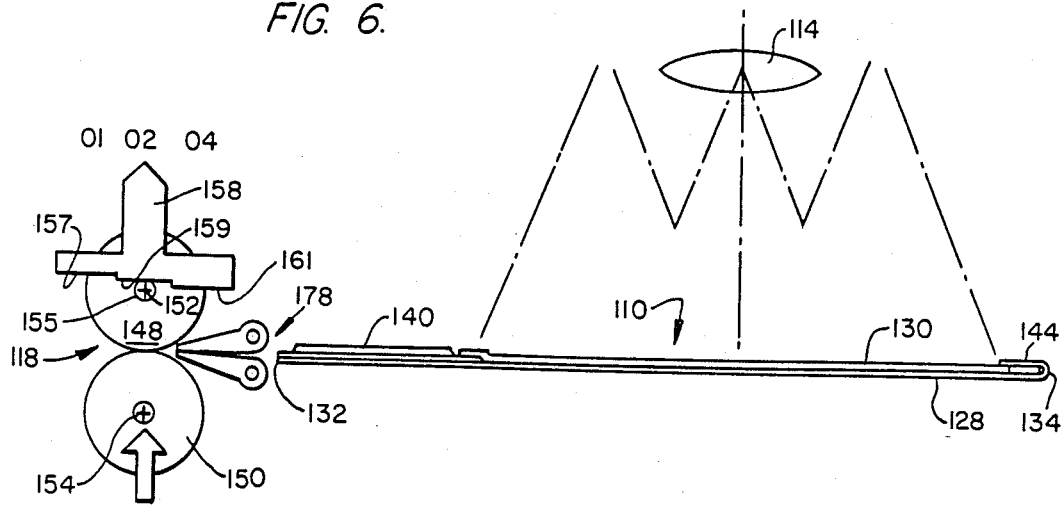
FIG. 6 is a schematic side elevation depicting an alternative embodiment of the photographic system.

In FIGS. 6 and 7 of the drawings, an alternative embodiment of the system of the present invention is illustrated and in which parts previously identified are designated by reference numerals having the same tens and digits numbers but in a one-hundred series. Thus, in FIGS. 6 and 7 the film unit 110 is again shown to include superposed sheets 128 and 130 to which a processing fluid pod 140 is secured at the leading edge 132 thereof. Also in this embodiment, a residual processing fluid trap is provided at the trailing edge of the unit 110 but in this instance by spacing between fingers or projections 133 formed at the trailing edge of the sheet 128 about which the flap 144 of the other sheet is folded. The fingers 133 serve to prevent compression of the folded flap and thus prevent extrusion of residual processing fluid which may have found its way to the space between the fingers 133.

The processing assembly 118 in the embodiment of FIGS. 6 and 7 again includes upper and lower rollers 148 and 150. In this instance, the bottom roller 150 is supported for rotation about an axis 154 which is fixed whereas the top roller 148 is supported for rotation about an axis 152 defined by stub axles 155 positioned by stepped increments 157, 159 and 161 in a positioning bracket 158 capable of longitudinal positioning adjustment. Thus, depending on which of the steps 157, 159 and 161 engages the stub axle 155, the roller spacing effective on the film unit 110 will be determined. As will be apparent from the description below of a variation in this embodiment of the invention, the positioning of the bracket 158 may be accomplished by programmed cam formations on the cassette 12, for example, and corresponding to the particular characteristics of film components in a given cassette 12. In this way, the spacing of the rollers 148 and 150 may be controlled automatically.

Operation of the embodiment illustrated in FIGS. 6 and 7 is similar to that described with respect to FIGS. 1-4 with the exception that in the latter embodiment, the diameter of the rollers 148 and 150 is not related to the length of the film unit 110. As a result, continuous pressure will be exerted by the rollers 148 and 150 on the film unit 110 throughout the area of the trap at the trailing end 134. Spacing of the rollers is maintained, however, as the result of the fingers 133 projecting into the folded-over flap 144 of the sheet 128.

A variation of the embodiment shown in FIGS. 6 and 7 is illustrated in FIGS. 8-11 of the drawings as an exemplary camera system in which the pinch roller spacing of a processor assembly 218 may be controlled by tactile indicia on the cassette 212 containing several film units of the type, for example, as described previously with respect to FIGS. 3 and 4. The cassette 212 is adapted to be received in conventional fashion within a camera body 213 having a pivotal door or cover portion 215 movable from an open, cassette loading position (FIG. 8), where the processor assembly is remote from the cassette receiving chamber and is inoperative or disabled, to a closed position (FIG. 9) adjacent the cassette, where both the processor and cassette are in an operative position for the successive exposure and processing of the film units contained in the cassette 212. The door 215 supports a processor assembly 218 in which upper and lower pinch rollers 220 and 222, respectively, are supported from a generally U-shaped bracket 224 having upstanding end flanges 226. The upper roller 220 includes a pair of coaxial stub axles 228 journaled directly in the end flanges to effect a fixed rotational axis of the upper roller 220. The lower roller 222 is similarly formed with coaxial stub axles 230 at opposite ends of the roller 222 and journaled in slidable or movable bearing blocks 232 biased upwardly or toward the upper roller 220 by springs 234 (FIGS. 8 and 9).

Advancement of the film through the processing assembly 218 is preferably accomplished in the embodiment of FIGS. 8-11 by a pick arrangement in conjunction with roller rotation by any suitable motor drive similar to that shown in FIG. 3. However, it should be understood that the film advancement may be achieved by other means such as drawing or pulling the film assemblages through the rollers. In the latter circumstance, the rollers 220 and 222 would serve essentially as pressure applying members supported by the bracket 224 and the blocks 232 in a juxtaposed position extending transverse the path of film advancement.

The nip spacing of the rollers 220 and 222 is variable in correspondence to processing spacing increments needed to accommodate anticipated differences in film characteristics such as the film type, film thickness, and fluid viscosity, etc. This spacing adjustment is provided by a pair of shiftable cam members 236 and 238 positioned outwardly of the upstanding flanges 226 and contained between extensions of the stub axles 228 and 230 at opposite ends of both rollers. The shiftable cam members 236 and 238, which provide adjustable means for selectively positioning the movable roller 222 to define a plurality of roller gaps, are identically formed to include three incremental steps 240, 242 and 244 which represent increments of increased width in each of the cam members 236 and 238. Thus, where the step 240 is positioned between the stub axles 228 and 230 as shown in FIG. 8, for example, the rollers 220 and 222 are spaced to provide the narrowest nip gap contemplated for effective processing of exposed film units. A compression spring 246 yieldably positions the cam members 236 and 238 in this position or such that the narrow step 240 determines the position of the bottom roller 222. Also, it will be noted that the total distance of travel or throw of the cam members 236 and 238 is restricted by a pin 248 projecting from the end flange 226 adjacent the respective cam members 236 and 238 into a slot 250 provided in the member. Simultaneous throw of both cam members 236 and 238 is governed by a bell crank-like member 252 effective for interconnecting both cam members 236 and 238. The member 252 spans the distance between the cam members and is pivotal in slots 254 formed in the end flanges 226.

Associated with the cassette 212 is a tactile discontinuity, such as pin-like projections 256 on one exterior wall of the cassette, which provide control means for actuating the adjustable means (cam members 236 and 238) to define a select gap in accordance with the characteristics of the cassette contained materials. Alternative positions for the projections 256 are represented by dashed circles in FIGS. 8 and 9 and designated 256' and 256'', respectively. The pin-like projections 256 will lie in any of the three positions depicted along one or both sides of the cassette 212 to engage a rearwardly disposed striker edge 258 on at least the cam member 236 as the door 215 is moved from its opened position as shown in FIG. 8 to its closed position as shown in FIG. 9. With the pin-like projection 256 located in the central one of the three alternative positions, the cam members 236 and 238 will be advanced against the bias of the spring 246 so that the intermediate step 242 is positioned between the stub axles 228 and 230 of the respective rollers 220 and 222.

While in the illustrated embodiment two pin-like projections 256 are provided on opposite sides of the cassette 212 (FIG. 10), the bell crank-like member 252 enables a projection to be provided on one side only of the cassette with both cam members being moved under the interconnection provided by the member 252. It should also be understood that while the film processed in this embodiment is described as a film unit, supplied wholly within the cassette, this variable gap system is applicable to any film assemblage having at least a pair of superimposed sheets with processing fluid disposed at their leading edge. Additionally, one or more of these materials may be provided in the camera externally of the cassette for assembly with the cassette retained film during its advancement.

Moreover, it should be recognized that broadly the automatic gap variation could be accomplished in some applications by extensions of the cassette itself to cam apart, or cam together, the pressure members. Thus, taken together, the adjustable means (cam members 236 and 238) and the control means (projections 256) provide gapping means coupled to the cassette for selectively moving one or both of the pressure members, rolls 220 and 222, to define a processing gap in accordance with the characteristics of the cassette contained material.

From the preceding description and accompanying illustrations of alternative embodiments, several advantages of the present invention will be apparent. For example, the achievement of a complete, self-developing and integral film unit represented by the disclosed units 10 and 110, in a structural assembly constituted exclusively by two sheets and a processing fluid pod, enables film unit manufacture ver simply by cutting the two sheets from continuous webs of material from which they are formed for direct assembly with each other and the processing fluid pod. One or both of the webs from which the sheets 28, 30, 128 and 130 are cut may be precoated to include the photochemical layer 31 or may be preprinted, if desired, to achieve a framing border in the final film unit. In this latter respect, however, the film units 10 and 110 may be adapted to provide "borderless" prints due to the avoidance of any need for a binder frame of the type required in prior film units.

The system represented by the embodiment of FIGS. 1-4 is further advantageous due to the simplicity of structure providing a processing fluid trap at the trailing edge 34 of the film unit 10. The correlation of processing roll diameter so as to achieve one revolution of each roller during each processing cycle enables the use of a trap at the trailing edge which will be virtually undiscernible in the final print. Also, the avoidance of roll nip spacer rails in the film unit is significant from the standpoint of attaining reduced costs required to manufacture the film unit. Finally, the system represented by the embodiment illustrated in FIG. 8 allows automatic variation of the camera to tailor its processing to a wide variety of film characteristics and, hence, not only increases camera versitility, but also permits greater manufacturing tolerance in film manufacture.

Thus, it will be appreciated that as a result of the present invention, a highly improved instant photography system is provided by which the principal objective, among others, are completely fulfilled. It will also be apparent and is contemplated that variations and/or changes may be made in the disclosed embodiments without departure from the present invention. Accordingly, it is expressly intended that the foregoing description and accompanying drawing illustrations are illustrative of preferred embodiments only, not limiting, and that the true spirit and scope of the present invention be determined by reference to the appended claims

What is claimed is:

1. An instant photography system comprising:
a rectangular film unit having leaving, trailing and side edges, the physical structure of said unit consisting essentially of a pair of superposed sheets sandwiching a photochemical composition, a processing fluid pod located along the leading edge of the unit, a processing fluid trap defined exclusively by portions of said sheets along the trailing edge of the unit, and means for securing together to form said unit said sheets and said pod; and
processing means for rupturing said pod and spreading said processing fluid throughout the area between said sheets, said processing means comprising a pair of rollers supported to establish a predetermined spacing gap at said nip, the cylindrical surface of at least one of said rollers being of a circumference approximately equal to or greater than the length of said film unit between leading and trailing edges thereof, said one roller including a recess formation in its circumference and means for positioning the leading edge of a film unit in the nip of said rollers in trailing relation to said recess when viewed in relation to the film advancing rotation of said rollers such that upon rotation, said recess coincides with the trap portion of said film unit.

2. The apparatus of claim 1, wherein at least said one roller includes an entrance flat to receive the leading edge of said film unit and a recess to receive said trap.

3. The apparatus of claim 2, wherein both of said rollers include a cylindrical surface of a circumference approximately equal to or greater than the length of said film unit between the leading and trailing edges thereof and wherein both of said rollers include cooperating entrance flats to receive the leading edge of said film unit and cooperating recesses to receive said trap.

4. The apparatus of claim 1, including pressure shoe pairs positioned upstream from said pressure nip in terms of the direction of film unit travel through said nip, said pressure shoe pairs being adapted to seize the side edges of said film unit to prevent discharge of processing fluid along said side edges.

5. Processing apparatus for self-developing photographic film units of given length configured for the spreading of processing fluid between superposed sheets toward a trailing end of said film units with excess fluid received within a trap area located at said trailing end, said apparatus comprising a pair of processing rollers supported for rotation about parallel axes to define a pressure nip, at least one of said rollers having a circumference equal to or greater than the length of said film unit, said one roller including a recess formation in its cylindrical surface, and means for positioning the leading end of said film unit in the nip of said rollers in trailing relation to said recess when viewed in relation to film advancing rotation of said rollers such that upon said rotation, said recess coincides with the trailing end of said film unit to thereby avoid exerting roller pressure on said trap.

6. The apparatus of claim 5, wherein said roller includes a second recess defining a reference surface adjoining the trailing end of said trap recess for engaging and positioning the leading edge of said film unit in relation thereto, and the circumference of said roller between said reference surface and said trailing end of said recess as measured opposite the rotation of said rollers is substantially equal to the length of said film unit.

7. The apparatus of claim 6, wherein said second recess comprises an entrance flat in said one roller.

8. The apparatus of claim 5, including means to prevent the passage of processing fluid from opposite side edges of the film unit.

9. The apparatus of claim 8, wherein said means to prevent the passage of processing fluid comprises two pairs of pressure shoes aligned respectively with the side edges of the film unit and extending from said pressure nip in the direction of the film unit so that passage of the side edges of the film unit precede passage of the unit through said nip.

10. An instant photographic camera system comprising:
   a film cassette comprising:
      a housing containing at least one sheet of photographic film having given film characteristics;
      control means, indicative of at least one of said given film characteristics, carried by said housing for cooperating with a camera to define a select processing gap according to said one film characteristic; and
   a camera comprising:
      means for receiving said film cassette;
      means for cooperating with said film cassette for advancing said one film sheet through a processing station of said camera as a film assemblage with a sheet superimposed on said one film sheet and with processing fluid disposed at the leading edges of said sheets; and
      a processing station configured for receiving said film assemblage, said processing station including processing means for spreading said processing fluid between said sheets during advancement of said film assemblage, said processing means including a pair of pressure members supported in a juxtaposed position extending transverse the advancement of said film assemblage with at least one of said members being moveable with respect to the other member so as to define a processing gap therebetween, and gapping means configured for engagement with said control means of said cassette for positioning said one member with respect to said other member to define said select processing gap in accordance with said one film characteristic.

11. The system of claim 10 wherein said control means comprises a tactile discontinuity located on said cassette in correspondance to a said given film characteristic and said gapping means of said camera includes adjustable means movable for selectively positioning said one member in response to engagement with said discontinuity to thereby define said select processing gap.

12. The apparatus of claim 11 wherein said adjustable means comprises a pair of cam members shiftable for establishing the position of said one member and thus the spacing gap between said members, said cam members being located one at each end of said one member in operative relation thereto, and means interconnecting said cam members for simultaneous shifting movement responsive to engagement of one of said cam members with said cassette discontinuity.

13. The apparatus of claim 11, including means for displacing said processing station between an inoperative location remote from said cassette receiving means and an operative position adjacent said cassette receiving means, and said adjustable means is positioned to a select location responsive to engagement with a cassette upon movement of said processing station to its said operative position.

14. The apparatus of claim 13, wherein said discontinuity comprises a projection located on said cassette in any one of several alternative positions depending on given characteristics of the film unit components contained in said cassette.

15. An instant photographic camera for use with a film cassette containing at least one sheet of photographic film and carrying a tactile discontinuity indicative of a select processing gap corresponding to at least one characteristic of said one sheet of film, said camera comprising:
   means for receiving said film cassette;
   means for cooperating with said film cassette for advancing said one film sheet through a processing station of said camera as a film assemblage with a sheet superimposed on said one film sheet and with processing fluid disposed at the leading edges of said sheets;
   a processing station configured for receiving said film assemblage, said processing station including processing means for spreading said processing fluid between said sheets during advancement of said film assemblage, said processing means including a pair of pressure members supported in a juxtaposed position extending transverse the advancement of said film assemblage with at least one of said members being moveable with respect to the other member so as to define a processing gap therebetween, and gapping means engageable with and discontinuity of said cassette for positioning said one member with respect to said other member to define said select processing gap in accordance with at least said one given film characteristic.

16. The camera of claim 15 wherein said gapping means includes adjustable means movable for selectively positioning said one member responsive to engagement with said cassette discontinuity.

17. The camera of claim 16 wherein said adjustable means comprises a pair of cam members shiftable for establishing the position of said one member and thus the spacing gap between said members, said cam members being located one at each end of said one member in operative relation thereto, and means interconnecting said cam members for simultaneous shifting movement responsive to engagement of one of said cam members with said discontinuity.

18. The camera of claim 16 including means for displacing said processing station between an inoperative location remote from said cassette receiving means and an operative position adjacent said cassette receiving means, and said adjustable means is positioned to a select location responsive to engagement with said cassette discontinuity upon movement of said processing station to its said operative position.

19. A photographic film cassette for use with a photographic camera having means for receiving a film cassette, means for advancing at least one sheet of film from the cassette and through a processing station of the camera as a film assemblage having a sheet superimposed on the one film sheet with processing fluid disposed at the leading edges of said sheets, the camera processing station including means for receiving said film assemblage and for spreading said processing fluid between said sheets during advancement of said film assemblage, said spreading means including a pair of pressure members supported in a juxtaposed position extending transverse the advancement of said film assemblage with at least one of said members being movable with respect to the other member so as to define a processing gap therebetween, and gapping means for positioning said one member with respect to said other member to define the processing gap for said pressure members, said cassette comprising:
 a housing containing at least one sheet of photographic film having given film characteristics; and
 control means located on said cassette housing for engaging said gapping means to define a select processing gap in accordance with at least one of said given film characteristics.

20. The cassette of claim 19 wherein said control means comprises a tactile discontinuity indicative of said at least one film characteristic.

21. An economical self-developing film unit comprising:
 a first sheet of generally rectangular configuration having a leading edge, a trailing edge and a pair of spaced apart side edges;
 a second sheet of generally rectangular configuration having a leading edge, a trailing edge and a pair of side edges spaced apart substantially the same distance as said side edges of said first sheet are spaced apart, one of said sheets including a photosensitive composition, said second sheet being disposed in overlying superposed relationship with respect to said first sheet; and
 a rupturable pod of processing fluid attached to said leading edges of said first and second sheets in a manner whereby external pressure applied thereto will effect the release of said processing fluid rearwardly between said first and second sheets;
 said first sheet extending rearwardly beyond said trailing edge of said second sheet so as to present a fold therein rearwardly of said trailing edge of said second sheet with its said trailing edge sealed to the exteriorly facing side of said second sheet in the vicinity of said trailing edge of said second sheet, said seal constituting the only bond directly between said first and second sheets so that said first and second sheets are virtually freestanding components with respect to each other for the major portions of their full lengths, said fold constituting a trap whose initial interior volume is adapted to expand, substantially without creating stress in any of the materials defining said trap, as excess fluid is caused to flow thereinto after having traversed said photosensitive composition of said film unit.

22. The film unit of claim 21 wherein said seal is spaced a small distance forwardly of the trailing edge of said second sheet to provide a usable trap space intermediate a portion of said first sheet and said exteriorly facing side of the said second sheet.

23. An economical self-developing film unit consisting of:
 a first sheet of generally rectangular configuration having a leading edge, a trailing edge and a pair of spaced apart side edges;
 a second sheet of generally rectangular configuration having a leading edge, a trailing edge and a pair of side edges spaced apart substantially the same distance as said side edges of said first sheet are spaced apart, one of said sheets including a photosensitive composition, said second sheet being disposed in overlying superposed relationship with respect to said first sheet; and
 a rupturable pod of processing fluid attached to said leading edges of said first and second sheets in a manner whereby external pressure applied thereto will effect the release of said processing fluid rearwardly between said first and second sheets,
 said first sheet extending rearwardly beyond said trailing edge of said second sheet so as to present a fold therein rearwardly of said trailing edge of said second sheet with its said trailing edge engaging the exteriorly facing side of said second sheet in the vicinity of said trailing edge of said second sheet, said first and second sheets being virtually freestanding components with respect to each other for the major portions of their full lengths.

* * * * *